United States Patent
Barker et al.

[15] 3,646,476
[45] Feb. 29, 1972

[54] PULSED GAS ION LASER

[72] Inventors: Gerald C. Barker, Palo Alto; Steven M. Jarrett, Los Altos, both of Calif.

[73] Assignee: Coherent Radiation Laboratories

[22] Filed: Nov. 24, 1969

[21] Appl. No.: 879,154

[52] U.S. Cl. ............................................331/94.5, 313/198
[51] Int. Cl. ......................H01s 3/09, H01s 3/02, H01s 3/22
[58] Field of Search.................................331/94.5; 313/198

[56] References Cited

UNITED STATES PATENTS

| 2,829,295 | 4/1958 | Gast et al. ..........................313/198 X |
| 3,533,012 | 10/1970 | Johnson et al. .......................331/94.5 |

OTHER PUBLICATIONS

Bell, " Visible Laser Transitions in $Hg^+$," Applied Physics Letters, 4, (2), 15 Jan. '64, pp. 34– 5.
" Low Priced c–w Laser is Rugged, Reliable," Laser Focus, Dec. 15, 1965, pp. 18– 19.
Everyman' s Laser for Classroom & Industry," Electronics, 39, (2), Jan. 24, 1966, pp. 141 & Table of Contents.
Korovitsyn et al., " Mode Selectron....of a Gaseous Laser Oscillator," Radio Eng. Electron. Physics, Vol. 11, 1966, pp. 572– 3.

Primary Examiner—Ronald L. Wibert
Assistant Examiner—R. J. Webster
Attorney—Limbach, Limbach & Sutton

[57] ABSTRACT

A miniature pulsed gas ion laser constructed so that the discharge tube forms the optical resonator. Internal cavity reflectors require no adjustment after fabrication. $TEM_{oo}$ output is provided at a single wavelength.

5 Claims, 5 Drawing Figures

INVENTORS
GERALD C. BARKER
BY STEVEN M. JARRETT

Limbach, Limbach & Sutton
ATTORNEYS

PULSED GAS ION LASER

BACKGROUND OF THE INVENTION

The invention relates generally to lasers and more particularly to a miniature pulsed gas ion laser.

Gas ion lasers are known in the art as shown in Bell, U.S. Pat. No. 3,464,025, Bridges, U.S. Pat. No. 3,395,364, and the copending application of Mefferd and Hobart, Ser. No. 842,956, filed July 18, 1969. Pulsed gas lasers are known as shown, for instance, in Goldsmith et al. U.S. Pat. No. 3,351,870. These lasers are large, complex and expensive instruments which require the most exacting manufacturing techniques.

In many emerging applications for laser technology, it is desirable to provide a relatively small sized and inexpensive source of coherent radiation. One such application is in the field of holography where a further requirement is found that the laser output must have the $TEM_{oo}$ mode.

SUMMARY OF INVENTION

Laser apparatus is provided of compact and inexpensive design wherein the discharge tube forms the optical resonator. Reflective mirrors are mounted on the end walls of the discharge tube and once adjusted during fabrication require no further adjustment By adhering to dimensions set forth below for the length and bore of the discharge tube, three advantages are obtained: (1) $TEM_{oo}$ output is provided at a single wavelength. (2) The tolerances for the length of the tube and the radius of a reflector are large enough that the tube may be fabricated with inexpensive machining techniques, and (3) maximum useful power can be obtained from a given length of active lasing medium.

Coupled with use of the discharge tube for the resonator support, this invention employs a closed gas medium in the discharge tube and a power supply for creating relatively infrequent short-duration discharge pulses in the discharge tube whereby the laser does not require expensive power supplies or gas handling systems.

The combination of these features produces a compact and very useful gas ion laser which can be manufactured at a small fraction of the cost of gas ion lasers known heretofore.

DESCRIPTION OF THE PREFERRED EMBODIMENTS

Figure 1:
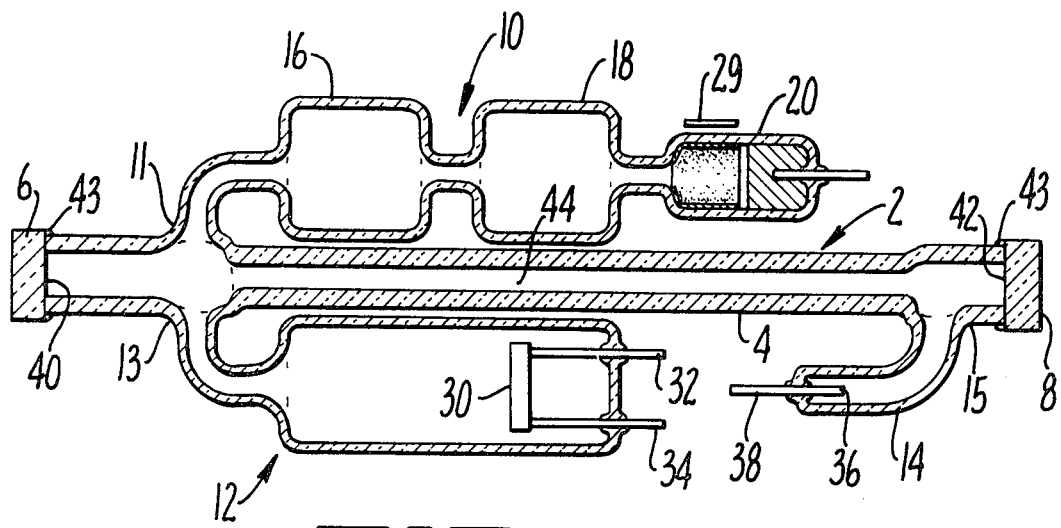
FIG. 1 is a diagram of an embodiment of the laser according to the present invention.

Referring now to FIG. 1, an embodiment of the pulsed ion laser according to this invention is shown built from an uniquely formed elongated hollow tube 2, filled with an ionizable gas and having an essentially cylindrical central portion 4 which may be made of standard glass tubing machined to length with its ends ground. Attached to the tube 4 are first and second pieces 6 and 8, a first branch or arm 10 disposed parallel to central portion 4 and joined thereto at a point 11 near end 6, a second branch or arm 12 disposed parallel to central portion 4 and joined thereto at a point 13 near end 6, and a third branch or arm 14 disposed parallel to central portion 4 and joined thereto at a point 15 near end 8. Tube 2 thus constitutes a unitary hollow structure having four portions.

Figure 2:
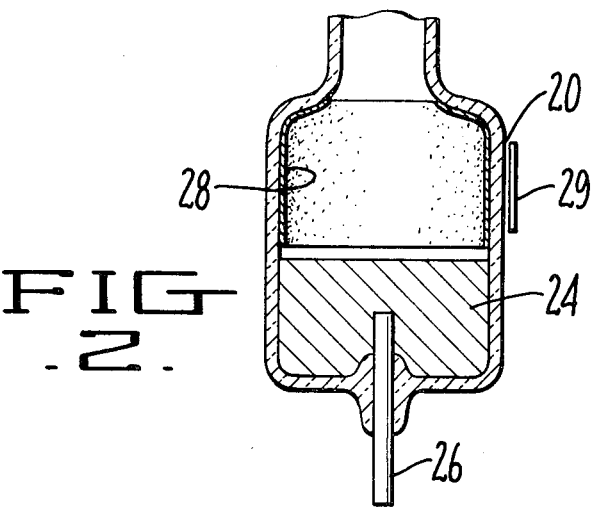
FIG. 2 is a more detailed diagram of a portion of the laser of FIG. 1.

Branch 10 includes dilated portions 16 and 18 that provide a reservoir for the ionizable gas and function as traps for the cathode as described hereinafter. Dilated end section 20 of branch 10, shown in greater detail in FIG. 2, includes a cold cathode 24 having an external terminal 26 and a conductive cylindrical film 28 disposed within section 20 and displaced slightly from cathode 24 so that the film 28 and cathode 24 are electrically isolated from one another by the gas in its normal state. Cathode 24 may be formed of indium, tin, or some other metal having a melting point below the tube material. Film 28 is formed by high-voltage sputtering from cathode 24 to a temporary anode disposed in arm 10 during fabrication. It has been found that the sputtering process naturally provides an insulating gap between cathode 24 and film 28. An external electrode 29 surrounds film 28 and is used to apply voltage as explained in greater detail below. Film 28 is used to draw an arc from cathode 26 in order to initiate discharge in the tube. The length between cathode and anode in tube 4 is too great for discharge to start without this auxiliary mechanism at the gas pressure and voltage employed, though the starting arrangement could be eliminated if a more expensive high-voltage power supply were used.

Branch 12 includes a getter electrode 30 having external contacts 32 and 34. Getter electrode 30 functions to trap any contaminant from cathode 24 or other sources that is not trapped. This getter is not absolutely essential to the operation of the laser and the entire branch tube 12 may be omitted if desired.

Branch 14 includes an anode 36 having an external terminal 38.

Figure 3:
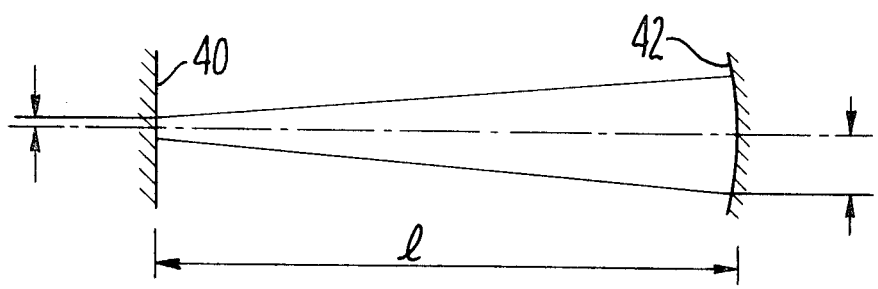
FIG. 3 is a sketch detailing the optics of the mirror system of the laser of FIG. 1.

End pieces 6 and 8 of the central portion 4 have flat and spherical mirrors 40 and 42, shown in greater detail in FIG. 3, mounted thereon, respectively. The mirror spacing $l$ is slightly less than the radius of curvature of mirror 42 to produce a $TEM_{oo}$ radiation pattern. Mirrors 40 and 42 are mounted an aligned during fabrication of the laser and require no further adjustment or alignment during use. Mirror alignment is obtained by providing the mirror coatings on end pieces 6 and 8 supporting the end pieces directly on cut and ground parallel end faces of tube 4 and there cementing the end pieces to the tube with epoxy cement 43. The position of mirrors 40 and 42 may be reversed, if desired, and the same results will be achieved. Laser output is preferably taken from the spherical mirror by allowing a small percentage of the laser energy to be transmitted. However, the output could be taken from the opposite mirror, if desired. Mirrors 40 and 42 mounted on the end portions 6 and 8, respectively, of central portion 4, define an internal cavity having an active discharge portion 44 between points 11 and 15. Discharge portion 44 in cooperation with mirrors 40 and 42 define the optical resonator. Thus, the tube functions as its own resonator.

In an exemplary embodiment of the invention, tube 2 was filled with Argon to a pressure of 35 to 65 millitorr. To provide a single line output at 5,145 AA., one of the mirror reflectors (40 or 42) is constructed in the form of a short-wavelength pass filter, thus eliminating the other normally produced Argon lines including that at 4,880 A. which normally has substantial output power. A cavity length of 15 cm. was chosen with an active discharge length of 11.5 cm. The active discharge portion 44 is bored to a constant diameter between 2 to 3 mm. preferably 2.1 mm. It has been found that tubes smaller than 2 mm. result in less power output and tend to display unstable electrical discharge. Also, the ratio of wall area to gas volume becomes such that ion loss at the walls becomes a problem. When the tube diameter is increased to 3 mm. or beyond with a 15-cm. resonator, the tube length must be controlled to excessively rigorous tolerances to produce a $TEM_{oo}$ output mode. Tubes of longer length and larger diameter may be used, but the dimensions of the tube should be controlled so that the effective diameter of the bore of the tube is between about one-fortieth and one-sixtieth of the length of the discharge path in the tube. The bore may be enlarged in some areas, but the effective diameter of the bore considered from the standpoint of its effect on the resonator geometry should be controlled within the above limits.

It is apparent that multiline wavelength output may be provided if desired or by proper selection of mirror characteristics, a single line other than 5,145 A. for Argon may be provided. The invention is in no way limited to Argon, as other ionizable materials may be used depending on the output wavelengths desired.

It has been found that certain structural limitations are imposed upon the laser of this invention if single wavelength and $TEM_{oo}$ output are required with a laser tube that forms its own resonator. In order to obtain single-wavelength operation, a selective high-reflectance mirror in the form of low-pass filters is sued. The loss introduced by this mirror at the unwanted wavelengths is sufficient to prevent laser oscillations at a given laser gain level. If the lase tube length is increased the gain increases. If the tube bore diameter decreases the gain increases approximately in an inverse relationship. If $TEM_{oo}$ operation is required in simple internal mirror structure, the laser bore can be used as the mode-limiting aperture. In order for the laser tube to function as its own resonator it must have structural rigidity. This restricts practical devices to 50 cm. or less. For devices of this length or shorter and for a gain level which allows a single-wavelength operation as determined by the length and bore diameter the requirement of $TEM_{oo}$ operation imposes structural limitations and mechanical tolerances on the laser tube. The tolerance on mirror separation depends upon the tube length and diameter. For a fixed length, it thus depends upon diameter alone. A mirror separation tolerance of between 0.005 inch and 0.010 inch is practical for ordinary grinding operations. As one goes to shorter lengths to maintain sufficient gain the bore diameter must be decreased. For bores much less than 2 mm., the electrical discharge characteristic becomes unstable. Therefore a certain minimum practical length is set at about 65 mm. by the discharge stability requirement.

Referring to FIG. 3, flat mirror 40 and spherical mirror 42 are shown. The radius of curvature of spherical mirror 42 is slightly longer than the mirror separation $l$ in order to provide $TEM_{oo}$ output.

In the preferred structure for the laser as illustrated in FIG. 1, the length of the tube, mirror separation is $149^{+-}0.25$ mm.; the bore diameter is 2.1 mm., and the radius of curvature of the spherical mirror is 150 mm. The spherical mirror is coated with a high-reflectivity coating having a transmission of $2.5^{+-}$½ percent at 5,145 A. The flat mirror has a low-pass filter coating having a reflectivity of at least 99.7 percent at 5,145 A. and less than 40 percent at 4,880 A. sold by Valpey Corporation, Holliston, Massachusetts. The length of the active discharge path is 11.5 cm. giving a ratio of discharge path length to bore diameter of about 55.

Figure 4:
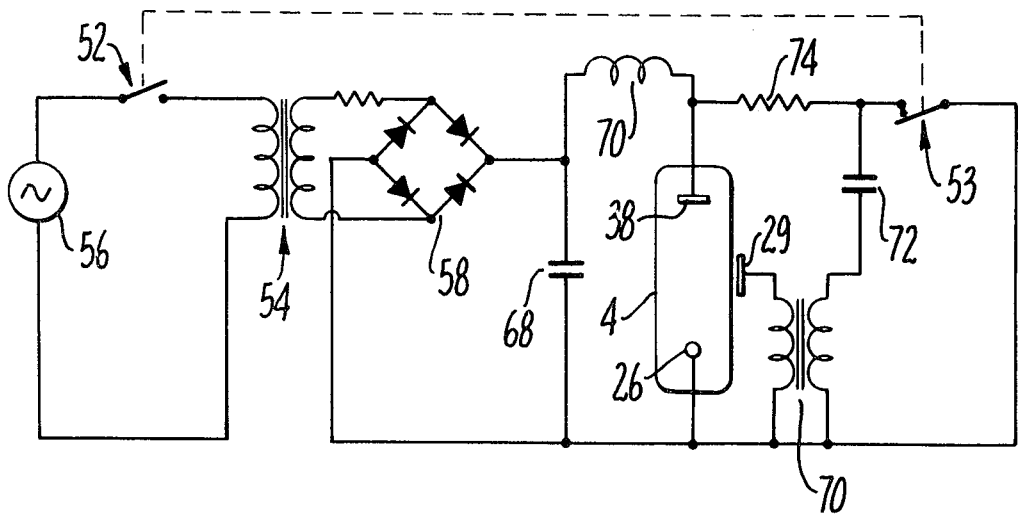
FIG. 4 is a schematic diagram of a power supply usable with the laser of FIG. 1.

Referring now to FIG. 4, a power supply suitable for use with the laser of FIG. 1 is shown. An AC voltage source 56 is connected in series with an SPST-switch 52 and the primary of transformer 54. Switch 52 is ganged with switch 53 so that when switch 52 is closed, switch 53 opens and the reverse. A full-wave bridge rectifier 58 is connected across the secondary of transformer 54. The rectifier output is connected across a capacitor 68 and across a series connection of inductor 70 and laser 4. Inductor 70 and the anode 38 of laser 4 are connected to the positive output of rectifier 58. Cathode 26 is connected to the negative output. A resistor 74, capacitor 72 and the primary of step-up transformer 70 are connected in series from the anode 38 to the cathode of laser 4. The secondary of transformer 70 is connected between the cathode of laser 4 and the excitation electrode 29 of laser 4. Switch 53 is connected across capacitor 72 and the primary of transformer 70.

In operation, switch 52 is closed, thus charging capacitors 68 and 72. Capacitor 72 charges relatively slowly due to the time constant introduced by resistor 74, thus no significant voltages are introduced into the secondary of transformer 70. Laser 4 does not lase initially because an arc must first be drawn between cathode 26 and film 28 by the application of voltage to electrode 29. Thus, when switch 53 is closed, opening switch 52, LC-circuit 70–72 being shorted by switch 53, oscillates inducing a large oscillating voltage at electrode 29 to initiate an arc in laser 4 whereby capacitor 68 discharges through laser 4 causing a pulsed laser output. As the capacitor 68 discharges below a threshold level at which it can no longer supply enough power to sustain a discharge in tube 4, lasing ceases. In practice a 50-$\mu$-sec. pulse is achievable as often as every 5 seconds. With such a pulse a minimum of 100 milliwatts of $TEM_{oo}$ 5,145-A. radiation is obtained.

If desired a DC source, such as a battery, in combination with an inverter or chopper, may replace AC-source 56 thus providing a miniature, portable battery powered laser.

Figure 5:
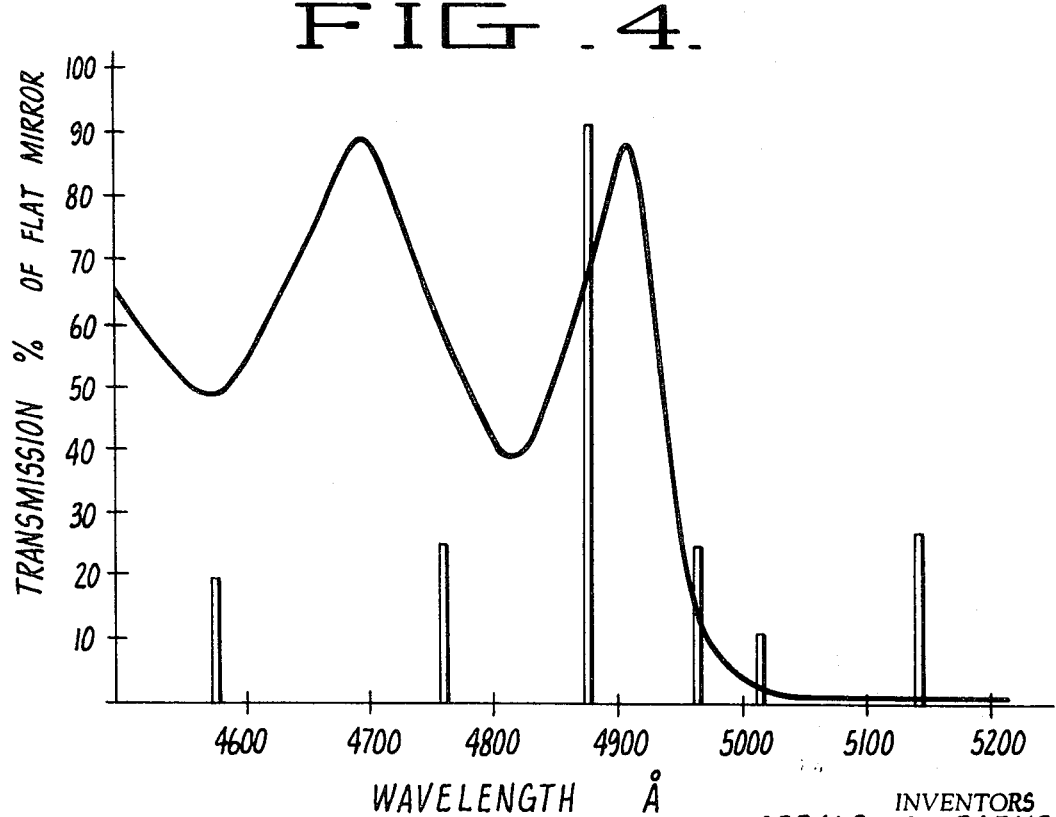
FIG. 5 is a graph of the Argon line spectra superimposed on the transmission response of one of the mirrors of the laser of FIG. 1.

Referring now to FIG. 5, the normal Argon wavelengths are shown as vertical bars with heights proportional to their gain relative to the gain of the 4,880-A. line. The curve shows the transmission characteristics of one of the mirrors indicating its transmission for the 5,145 A. and shorter wavelength Argon lines. The desired line 5,145 A., is highly reflected. The undesired lines, including the high-gain line at 4,880 A., are substantially transmitted. Other mirror characteristics may be chosen if desired. Thus, there is little buildup of the spontaneous emission through multiple reflections for any line except 5,145 A. This buildup eventually results in laser oscillation.

The laser thus described has been found to be particularly useful in photoelectric detection systems. For example, the laser could be used as a readout device in a holographic memory system.

While certain features and advantages of the invention have been illustrated and described in detail herein, it is obvious that many modifications can be made in the details disclosed without departing from the spirit and scope of the invention.

What is claimed is:

1. A pulsed gas ion laser comprising
   a. an elongated tube having a length which is greater than 65 millimeters and less than 50 cm. with an interior bore therein,
   b. a flat mirror mounted directly on and supported by one end of said tube,
   c. a spherical mirror mounted directly on and supported by the other end of said tube and having a radius of curvature which is approximately equal to and slightly greater than, the distance between said mirrors for producing $TEM_{oo}$ laser output from said tube,
   d. transmission means forming a part of one of said mirrors for transmitting a predetermined small percentage of light of a predetermined wavelength incident thereon to provide laser output from said mirror,
   e. an ionizable gas sealed in said tube, and
   f. electrode means in said tube including a cathode and anode establishing a discharge path in said tube which has a length along the axis of said spherical mirror which is between 40 and 60 times the effective diameter of said bore,
   g. a sputtered metal film positioned on the interior of said tube adjacent to and solely in the region of said cathode and an electrical conductor outside said tube adjacent to said metal film for applying a voltage differential between said cathode and said film.

2. Apparatus according to claim 1 wherein said cathode is a cold cathode.

3. Apparatus according to claim 2 wherein said elongated tube includes a central portion having ends on which said mirrors are mounted and first and second arms connected to said central portion, said cathode and said film disposed in said first arm and said anode disposed in said second arm.

4. The apparatus of claim 1 characterized further by the inclusion of means for establishing electron discharge pulses between said anode and said cathode with said means comprising
   a. a first capacitor connected between said anode and said cathode,
   b. a step-up transformer having its secondary connected between said cathode and said conductor adjacent to said film, c. a second capacitor connected in series with the primary of said transformer between said anode and said cathode, and d. switch means for alternatively charging said capacitors and shorting said second capacitor across the primary of said transformer.

5. In a gas laser having a hollow body made of an electrical insulating material, a cathode inside said body with said cathode made of an electrically conductive material, and an anode in said body spaced apart from said cathode for conducting a discharge current through the hollow interior of said body, the improved means for starting said discharge current which comprises a film of said electrical material sputtered onto the interior surface of said body adjacent to and solely in the region of said cathode and an electrical conductor outside said body adjacent to said film for applying a voltage differential between said cathode and said film.

* * * * *